Dec. 7, 1954

R. R. LAW 2,696,571

COLOR KINESCOPE

Filed Feb. 10, 1950

Inventor

Russell R. Law

By Roderick Malcolm

Attorney

United States Patent Office 2,696,571

Patented Dec. 7, 1954

2,696,571

COLOR KINESCOPE

Russell R. Law, Princeton, N. J., assignor to Radio Corporation of America, a corporation of Delaware Application February 10, 1950, Serial No. 143,405

13 Claims. (Cl. 313—73)

This invention is directed to a cathode ray tube and more specifically to a television viewing tube for viewing pictures in color. This application is a continuation-in-part of my co-pending application Serial 130,195, filed November 30, 1949.

A great problem of color television reception is the complexity of the apparatus required for receiving television pictures in color. Past devices have included a plurality of cathode ray viewing tubes, each supplying a picture in a specific color, with the several colored pictures being recombined optically to form a panchromatic television picture. Other devices have utilized single tubes, combined with complex mechanical means such as colored discs synchronized to the incoming signals to produce the pictures in color. Such devices, for reproducing television pictures in color, have been unduly complex and have resulted in many unsolved problems both electrical and mechanical.

Suggestions have also been made to produce television pictures in color with the use of a single tube. Such suggestions however, have also been complex so as to discourage practical construction of a single color tube. Such complex problems have been involved in the manufacture of an appropriate phosphor screen producing more than one color of luminescence. Also, other complexities occur in the construction of plural gun tubes or attempts in utilizing single gun tubes to produce a plurality of colors.

It is therefore an object of my invention to provide a simplified means for receiving television pictures in color.

It is a further object of my invention to provide a single television viewing tube which can be used with conventional systems to provide a television picture in color.

It is a further object of my invention to provide a single television viewing tube which is of a simplified design and construction.

The specific invention described below is directed to a cathode ray viewing tube for reproducing television pictures in color. The phosphor screen of such a tube is formed of small elements in the order of a picture element in size, which are coated with a plurality of phosphors each of which provides a different luminescence upon excitation by a cathode ray beam. These elemental portions of the phosphor screen are formed with a configuration, such that when the electron beam approaches the target from a given direction, only one of the phosphor materials coating each elemental portion is struck by the beam. Means are provided between the electron gun of the tube and the phosphor screen to impart a selective directional approach of the electron beam to the target screen. Such beam direction imparting means are rotating magnetic or electrostatic fields, which first deflect the electron beam from its normal path and then redirect the beam back to its path, so that it substantially crosses the normal electron path at an angle thereto. Focusing means are then provided for bringing the electrons of the beam to a fine spot at the surface of the phosphor screen. Due to the displacement given to the beam, it will strike the phosphor screen from a given direction and in a time sequence corresponding to color signals applied to the control grid of the gun.

The novel features which I believe to be characteristic of my invention are set forth with particularity in the appended claims, but the invention itself will best be understood by reference to the following description taken in connection with the accompanying drawing in which:

Figure 1:
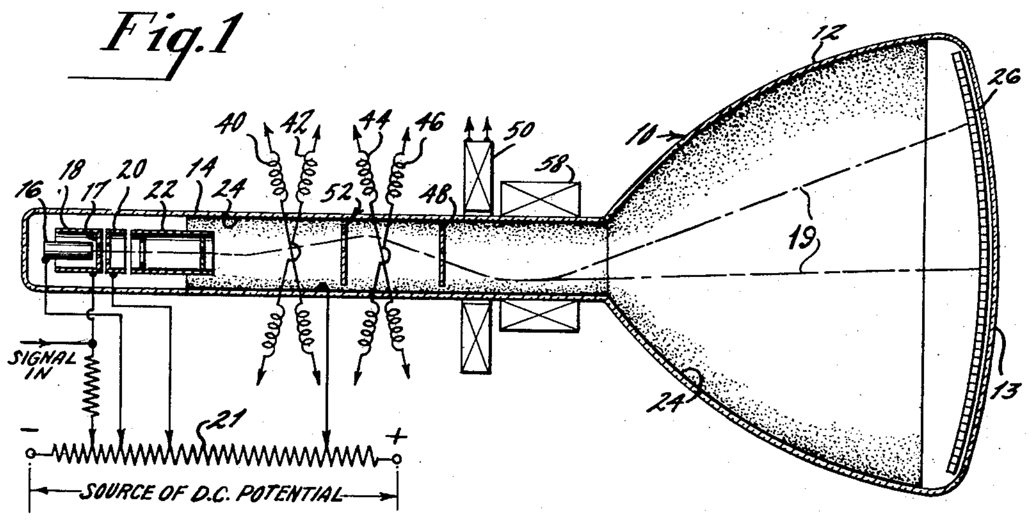
Figure 1 is a sectional view of a cathode ray viewing tube for viewing television pictures in color according to my invention.
Figure 6:
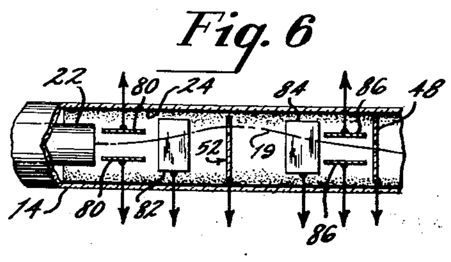

Figure 6 discloses a partial sectional view of another form of the tube shown in Figure 1.

Figure 1 discloses a novel structure for producing a color television picture by the use of a single cathode ray tube. The tube of Figure 1 has an evacuated envelope 10 having a substantially conical bulb portion 12 and a tubular neck portion 14 fixed coaxial to the bulb portion 12. Mounted within the tubular envelope portion 14 is an electron gun means for providing a beam of electrons along a normal path. The electron gun comprises essentially of a source of electrons or cathode electrode which may be of conventional form such as a short metal cylinder 16 closed at the end facing the conical portion 12 of the tube envelope. This closed end of cathode cylinder 16 is coated with an electron emitting material such as a mixture of barium and strontium oxides for providing, at a suitable temperature, a free emission of electrons. The electrons from the coated cathode surface 16 are caused to pass through an apertured negatively biased control electrode or grid 18 by the positive accelerating field provided by an accelerating anode electrode 20. As shown in Figure 1, control grid 18 comprises a tubular electrode telescoped over the coated end of the cathode 16 and having an apertured plate electrode 17 closely spaced from the coated cathode surface. In a tube of the type shown in Figure 1, control grid 18 is operated at a few volts negative with respect to cathode potential, while accelerating electrode 20 is maintained in the order of 200 volts positive relative to cathode potential. Accelerating anode 20 is a short tubular electrode having also an apertured plate or diaphragm closing the end adjacent to the cathode. The electron gun consists of an additional tubular electrode 22, which in the tube described is adapted during tube operation to be maintained at a relatively high potential in the order of 1000 to 2000 volts relative to cathode potential. A second anode electrode 24 is formed as a conductive coating on the inner surface of the tube neck. Coating 24 extends as is shown in Figure 1, into the conical portion 12 of the tube envelope to a point adjacent to the face plate 13 of the tube envelope. Electrode 14, in the tube described, may be maintained during tube operation at a potential in the order of 10,000 volts to provide a sufficient acceleration for the electrons of the beam. As is well known, the several electrodes described as comprising the electron gun of the tube, provide appropriate fields therebetween to form the electrons emitted from the surface of cathode 16 into a beam of electrons which tend to pass along a normal path substantially along the axis of the neck and cone portions of the tube envelope 10. The potentials stated above are only illustrative of those applied to a tube of the type of Figure 1 and need not be limiting. The several electrodes are respectively connected to sources of potential, such as a voltage divider 21.

Figure 2:
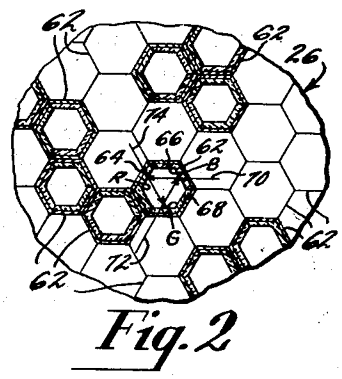
Figure 2 is one form of a phosphor screen which can be utilized in the novel tube of Figure 1.

At the large end of the conical portion 12 of the tube envelope, there is positioned a phosphor screen 26 for providing a luminescent picture. The type of screen 26 which is utilized in the tube of Figure 1 may take several forms. As shown in Figure 2, screen 26 may comprise a plurality of tubular hexagonal shaped cells 62 arranged in honeycomb fashion. Each cell has cross-sectional dimensions in the order of a picture element or that of the spot size of the beam 19 at the screen. The showing in Figures 1 and 2 are greatly enlarged for illustration. The inner surfaces of each hexagonal cell are coated with appropriate phosphor materials. For example, the inner surfaces of two adjacent faces are coated with a single phosphor material 64 which may luminesce with a red colored light when struck by a cathode ray beam. Two other adjacent faces of each hexagonal cell 62 are coated with a second phosphor material 66 luminescing with a blue light, while the two remaining faces of the unit 62 are coated with a third phosphor material 68 which may luminesce with a green light. It is noted that the red luminescing phosphor 64 will be struck by an electron beam when screen 26 is approached by a beam from the direction of the arrow 70, while the blue luminescing phosphor 66 will only be struck by a beam approaching the target from a direction indicated by the arrow 72 and similarly the green luminescing phosphor 68 will only be activated by electrons approaching the target in the direction of arrow 74. In the screen 26 of Figure 2, the arrangement of parts is such that the three directions 70, 72 and 74 are substantially spaced 120° apart so that each phosphor coated area is masked from two of the three directions.

Such an arrangement of phosphor surfaces as shown in Figure 2 provides a directional type phosphor screen which will provide red, green or blue luminescence when bombarded by an electron beam coming from any one of three directions respectively. For example, if an electron beam approaching any portion of the screen 26 from the direction of the arrow 70 is scanned over the screen surface, it will tend to strike only red luminescent areas 64. The other blue and green luminescing areas 66 and 68 respectively, are masked from the beam by the configuration of the screen. In like manner, an electron beam approaching screen 26 from the direction of arrow 72 will tend to strike all of the blue luminescing areas 66, when it is scanned over the surface of the screen; and an electron beam approaching the target 26 in the direction of the arrow 74 will strike only the green luminescing surfaces 68, when scanned over the surface of the screen.

Means are provided to cause the electron beam 19 to approach the directional or hexagonal screen 26 from any one of the three directions, 70, 72 and 74. The beam is first given a displacement from its normal path by a rotating magnetic field provided by the two pairs of coils 40 and 42. By connecting the pairs of coils 40 and 42 to appropriate varying voltage sources of a type which will cause to flow through coils 40 and 42 current pulses having a sine wave configuration, the electron beam is given a rotational displacement about its normal path, or axis of the tube portion 14. The current pulses flowing in the pair of coils 40 are set to be 90° out of phase with the current flow through coils 42 as is well known. The electron beam is returned to its normal path or the axis of the tube by a rotating field established by pairs of coils 44 and 46 which provide an equal and opposite deflection to the electron beam to that applied respectively by coils 40 and 42. To provide this result, the pairs of coils 44 and 46 are similarly connected to voltage sources providing currents of a sine wave configuration and which are respectively 90° out of phase.

The field of coils 44 and 46 neutralize the deflection of the beam by the first field of coils 40 and 42 and return the electron beam to the axis of the envelope portion 14 and at an angle thereto. Substantially at the point where the electron beam tends to cross the tube axis, is positioned an apertured beam-defining electrode 48. As is shown in Figure 1, electrode 48 may comprise a metallic disc or diaphragm or plate having a small aperture in the center thereof substantially coaxial with the tube neck portion 14. The electron beam, returned to the normal beam path by the fields of coils 44 and 46, will pass through the aperture of electrode 48 at an angle to the tube axis and to the normal beam path.

A magnetic focusing field is provided by an electromagnetic coil formed as a unit 50 and mounted on the tube neck 14 as shown in Figure 1. The focusing coil 50 is connected in an appropriate circuit and provides a focusing field between the defining electrode 48 and the phosphor screen 26, to focus the electrons of the beam passing through the apertured electrode 48 to a fine spot on the phosphor screen 26, as is well known in the art.

With a proper alignment of parts, the axis of the focusing field of coil 50 will substantially coincide with the axis of the electron gun. The path of the beam is roughly designated by the dotted line 19 in Figure 1. As shown, the beam crosses the electron gun axis at the limiting aperture of electrode 48, and enters the focusing field of coil 50 at a point radially spaced from the axis of the focusing field. It is well known in electron optics that an electron beam passing through a lens field, will be acted upon in a manner to cause all portions of the beam diverging from the field axis, to be brought together at a focus point beyond the lens field. A detailed explanation of this action of magnetic lenses may be found in such standard references as "Electron Optics" by Myers, and "Geometrische Elektronenaptik" by Brüch and Scherzer. Since all of the electron beam of the tube of Figure 1 passes into the field of focusing coil 50 at an angle to the field axis, the lens field of coil 50 will bend the beam back toward the field axis so that it will approach the surface of the phosphor screen at an angle. Thus, as the beam is rotated about the axis of the tube by the fields of coils 40, 42, 44 and 46, it will approach the surface of screen 26 at substantially the same angle of incidence but sequentially from different directions.

Furthermore, the direction in which the electron beam 19 approaches screen 26 is determined by the direction of the displacement of the beam by the rotating fields of coils 40, 42, 44 and 46. Thus, if a rotational displacement of the beam is provided by the displacement coils, beam 19 will approach screen 26 as a beam appearing to rotate about the point of impact and in phase with the rotational displacement provided by the displacement fields of coils 40—46. If the beam 19 is focused at a particular spot on screen 26, the beam will strike that spot successively from different directions.

Figure 3:
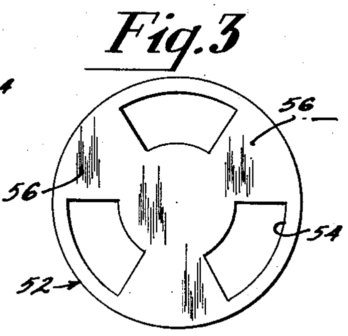
Figure 3 is a plan view of an electrode structure utilized in the novel tube of Figure 1.

Since screen 26 is of the type described in Figure 2, it is only necessary to provide an electron beam striking the screen from substantially the three specified directions, 70, 72 and 74. To provide this result, a commutating electrode 52 is mounted, as is shown in Figure 1, between the beam displacing fields. The commutating electrode 52 is shown in the enlarged plan view of Figure 3 and consists essentially of an apertured plate or disc mounted normal to the tube axis. The electrode 52 has, as is shown, a plurality of arcuately shaped apertures 54, spaced at equal angular distances around the center of the electrode. Furthermore, the apertures 54 are positioned radially from the center of electrode 52 at substantially the same distance as the beam is displaced from its normal path by the displacement coils 40 and 42. As the rotating beam describes a circular path over the surface of electrode 52, only that portion of the beam passing through the apertures 54 will pass down the tube to strike screen 26. The solid portions 56 of electrode 52 are opaque to the beam electrons and will prevent passage of the beam at these points. In the tube described and shown in Figures 1, 2 and 3, electrode 52 has three apertures 54, angularly spaced at substantially 120° about the gun axis. Thus, the electron beam 19 between electrodes 52 and 48 will be confined to those electrons displaced from the normal beam path in substantially the three radial directions of apertures 54 and the electrons of beam 19 striking screen 26 will be only those which approach screen 26 from these three directions, substantially 120 degrees apart. The position of the commutating electrode 52 relative to the hexagonal surfaces of screen 26 is such that beam 19 in approaching screen 26 from three directions will follow substantially the paths indicated by arrows 70, 72 and 74 of Figure 2.

The main purpose of the commutating electrode 56 is to prevent a blurring of the colors by the electron beam. If beam 19 were permitted to approach screen 26 from all directions, it can easily be seen that, when the beam approaches the target from a direction between any two specified directions as 70 and 72 in Figure 2 for example, the beam will tend to strike two surfaces simultaneously instead of a single surface. It is desirable, that the beam be cut off at this point. The opaque portions 56 of electrode 52 thus provide means for preventing the electron beam from approaching target 26 from any direction substantially midway between the indicated directions 70, 72 and 74. It should be noted, however, that although the tube of Figure 1 is limited to an electrode structure 52 for commutating the beam, a similar result may be provided by applying a blanking voltage to the control grid 18 so as to cut off the beam entirely at points in its rotational path corresponding to the opaque portions 56 of the commutator electrode 52. In this manner, then, the electron beam 19 will also strike target 26 as a series of pulses approaching the target from substantially the indicated directions 70, 72 and 74.

In a tube of the type disclosed in Figure 1, the electron beam passes through the electrode 48 at an angle of substantially 6 degrees to the gun axis and is caused to approach screen 26 at an angle of incidence of substantially 1 degree by the focusing field of coil 50.

A conventional type deflection yoke 58 is mounted on the envelope portion 14 to provide appropriate transverse deflecting fields for scanning the electron beam 19 over the surface of the phosphor screen 26. The deflecting yoke comprises two pairs of deflecting coils; the coils of each pair are connected in series to appropriate sawtooth voltage sources for providing line and frame scansion. Such circuits and arrangements are well known and do not constitute a part of this invention.

During tube operation, the beam 19 will pass into the deflecting fields of yoke 58 in paths spaced from the tube axis as shown. During line and frame scansion of the beam over the target surface, beam 19 will be deflected by the scanning fields from deflection points roughly spaced at equal distances from the axis of the envelope portion 14. If a phosphor screen, similar to that shown for Figure 2 is mounted within the conical portion 12 of tube envelope 10, each surface of the tubular hexagonal units 62 will lie in a plane passing substantially through the central portion of the deflecting fields of coils 58. That is, the plane of each surface will pass through a point which is substantially the center of the circle defined by the several deflection points of the beam and will also pass between two of the three directions from which the beam approaches the respective target surface and parallel to the third beam direction.

Screen 26 may be formed separately and mounted within the tube, in any well-known manner, or the screen may be formed as part of the face plate 13 of envelope 10, and sealed to the tube envelope.

It is well known that the phosphor screen of a cathode ray tube may be given a curvature so that when the beam is scanned in any manner over the phosphor surface, it will always approach the screen in a normal direction to it. To provide this result, it is found best to give the phosphor screen 26 a spherical configuration having a center of curvature at the center of the points of deflection of the electron beam by the scanning fields. Furthermore, the tubular elements 62 of the screen 26 are arranged to conform with such a spherical configuration and in a manner so that the axis of each tubular element 62 substantially coincides with the radius of curvature of screen 26, and so that they are normal to the scanned surface of screen 26 at all points. In this manner, then, the electron beam 19 which approaches the screen 26 at a slight angle to its normal path, as described above, will strike the inner surfaces of each of the tubular elements 62 to excite the several phosphor coatings within each tubular member to luminesce with its corresponding light. It is to be noted from Figures 2 and 4 that the several phosphor coatings within each tubular element 62 or 78 face the same direction relative to the axis of the tubular element and which direction is different from that faced by the other phosphor coatings. It can be noted that when the beam 19 is displaced from its normal path, by coils 40—46 in any one of the several directions which the phosphor coatings face, the beam will be returned to its normal path by the focusing field of coil 50 and will strike the phosphor coating which is facing in the direction the beam was first displaced.

The tube described may be utilized in any of several well known types of color television systems. Such systems may be those in which a whole frame is scanned in one color followed by successive frames in different colors; or such a system may be a line sequential system in which each successive line scanned is a different color. A further system is an elemental sequential system in which, as the beam strikes successive screen surfaces, a different face is struck by the beam and thus a different color is produced at each elemental surface. It is obvious that the beam striking a part of each cellular screen surface must have the appropriate modulation corresponding to the color produced. The displacement of the beam by coils 40 to 46 must be so synchronized with the incoming video signals that the beam striking the red luminescing surfaces of target 26 for example, will be modulated by the red video signal applied to the control grid 18 of the electron gun. Likewise, when the beam approaches screen 26 from the blue and green directions, that it be correspondingly modulated by blue and green signals. Thus, the deflecting coils 40 to 46, must, of necessity, be keyed with the incoming picture signals so that the beam displacement or rotation has the same time sequence as the video signals applied to the control grid 18.

Figure 4:
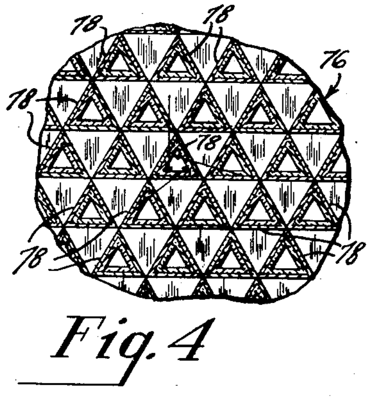

The target screen of Figures 1 and 2 need not be confined to hexagonal shaped units, but may be formed of tubular members having a triangular cross-section as shown in Figure 4. Figure 4 discloses a screen 76 formed of tubular units 78 of triangular cross-section, having on each of the inner surfaces thereof, a different phosphor, respectively, which will luminesce with one of the primary colors, red, blue or green. Screen 76 is mounted in the tube envelope with the edges of the triangular units 62 facing toward the electron gun and so that the inner surfaces of the units 62 lie in planes passing through the center of deflection points of the electron beam between two of the approaching beam directions and parallel to the third beam direction. Screen 76 is thus directional and electrons approaching the inner surfaces of unit cells 78 from a specific direction as indicated by the arrows will strike only one of the phosphor coatings.

Figure 5:
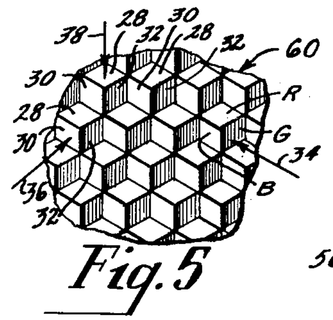
Figures 4 and 5 illustrate modifications of the phosphor screen structure which may be utilized in the novel tube of Figure 1.

The phosphor screen may also take the form of a plurality of surfaces forming small pyramids, shown in Figure 5, each pyramid having, in the example shown, three faces 28, 30 and 32. The pyramidal surfaces are arranged with corresponding faces facing the same direction and those surfaces facing in the same direction are coated with the same phosphor material. As, in the example of Figure 5, such faces indicated by 28 are positioned to face in the same direction and are coated with the same phosphor material, which may be that providing a red luminescence when struck by a cathode ray beam. Those faces 30 of the pyramidal surfaces are also positioned to face in the same direction, different from the first direction, and are coated with a phosphor material, which may give a blue luminescence when struck by a cathode ray beam. Also, in like manner, the pyramidal faces 32 are arranged to face in the same direction different from the other two directions and are coated with a phosphor material providing a green luminescence when struck by a cathode ray beam. A screen formed in this manner will require a larger angle of incidence than the 1 degree found practical with screens of the type of Figures 2 and 3.

It is noted that the screens and tubes described above and disclosed in Figures 1 through 5 utilize three different phosphor materials. It should be noted, however, that such structure need not be limited to the three phosphors luminescing with three different primary colors, but such structure may also be modified to use a screen formed of two phosphor materials luminescing with complementary colors. In this instance, then, the approach of beam 19 to the target surface need be only from two corresponding directions. The commutator electrode 26 may be designed accordingly to have only a pair of apertures, 180° apart, or at any desired spacing corresponding with the required directional approach of the beam at the target. Also, it is conceivable that with a more complex target structure, more than three different phosphor materials may be used in making the screen and that the gun and electrode structure of the tube can be modified to provide an approach of the beam to the screen from more than three different directions.

The above described tube of Figures 1 through 5 need not be limited to magnetic displacing fields provided by coils 40 through 46. As shown in Figure 6, electrostatic displacement of the beam may be utilized also through the provision of pairs of deflecting plates on both sides of the commutator electrode 32. As shown in Figure 6, between the anode electrode 22 and commutator 32 are positioned two pairs of deflecting plates, a vertical deflecting pair 80 and a horizontal deflecting pair of plates indicated by the single plate 82. Such plates are connected in any well known manner to sources of potentials which, for each pair of plates are respectively 90° out of phase to provide rotation of the beam about its normal path and over the apertured surface of electrode 52. In a similar manner, but in an opposite sense, two other pairs of deflecting plates represented by 84 and 86 are positioned between commutator electrode 56 and the limiting electrode 48. The pairs of plates 84 and 86 return the electron beam to its normal path, but at an angle thereto so that the beam will pass through the aperture of electrode 48 at an angle to the tube axis and to the normal path of the electron beam. As described above, for Figure 1, when the aperture of electrode 48 is imaged on the phosphor screen, the electrons of the beam will thus approach the screen at an angle thereto and due to the commutating action of electrode 52, beam 19 will strike the appropriate surfaces of the tube target.

It is also within the scope of this invention that the beam displacement means be not limited to either wholly electrostatic means or to wholly electromagnetic means, but it is possible that a combination of electromagnetic and electrostatic fields may be used to first displace the beam from its normal path and then return it thereto at an angle in order to provide a directional approach of the beam to the target screen.

The main purpose of the commutating electrode is to prevent a blurring of the colors by the electron beam. If beam 19 were permitted to approach screen 26 from all directions, it can easily be seen that, when the beam approaches the target from a direction between any two specified directions as 34 and 36, in Figure 2 for example, the beam will tend to strike two surfaces simultaneously instead of a single surface. It is desirable, then, that the beam be cut off at this point, so that it will not approach target 26 from any direction substantially midway between the indicated directions 34, 36 and 38. It should be noted, however, that although the tube of Figure 1 is limited to an electrode structure 52 for commutating the beam, a similar result may be provided by applying a blanking voltage to the control grid so as to cut off the beam entirely at points in its rotational path corresponding to the opaque portions 56 of the commutator electrode 52. In this manner, then, the electron beam 19 will strike target 26 as a series of pulses approaching the target from substantially the indicated directions 34, 36 and 38. It is to be noted further that any type of directional target may be used with the commutated rotating beam tube described in Figure 1. As another added example, the pyramidal projections illustrated for screen 26 in Figure 1 may also be pyramidal indentations in a flat surface of a screen. Such a screen would also operate satisfactorily.

While certain specific embodiments have been illustrated and described, it will be understood that various changes and modifications may be made therein without departing from the spirit and scope of the invention.

I claim:

1. An electron discharge device comprising, an electron gun means for forming a beam of electrons along a normal path, a target electrode positioned transversely of said beam path, said target electrode having a plurality of surfaces divided into series with the surfaces of each series facing substantially the same direction different from the direction faced by surfaces of the other series, means between said gun and said target for scanning said electron beam over said target surfaces, and deflecting means including a focussing coil, said beam deflecting means being positioned adjacent said gun and between said gun and said target for causing said beam to strike said target from one of said different directions.

2. An electron discharge device comprising, an electron gun means for forming a beam of electrons along a normal path, a target electrode positioned transversely of said beam path, said target electrode having a plurality of surfaces divided into series with the surfaces of each series facing the same direction different from the direction faced by the surfaces of said other series, means between said gun and said target for scanning said electron beam over said target surfaces, a beam defining electrode between said electron gun means and said target, said beam defining electrode including a plate transverse to said beam path and having an aperture therethrough aligned with said normal beam path, beam deflecting means between said defining electrode and said gun for causing said beam to pass through said apertured electrode at an angle to said normal beam path, and means for focusing the electrons passing through said apertured electrode onto said target plate electrode.

3. An electron discharge device comprising, an electron gun means for forming a beam of electrons along a normal path, a target electrode positioned transversely of said beam path, said target electrode having a plurality of surfaces divided into series with the surfaces of each series facing substantially the same direction different from the direction faced by the surfaces of said other series, means between said gun and said target for scanning said electron beam over said target surfaces, a beam defining electrode between said electron gun means and said target, said beam defining electrode comprising a plate transverse to said beam path and having an aperture therethrough aligned with said normal beam path, a first beam deflecting means between said gun and said apertured defining electrode for displacing the electrons of said beam from said normal beam path, and a second beam deflecting means between said electron gun and said defining electrode for directing said displaced electron beam through said apertured plate at an angle to said normal beam path, and means for focusing the electrons passing through said aperture onto said target electrode.

4. An electron discharge device comprising, an electron gun means for forming a beam of electrons along a path, a target electrode having a face positioned substantially normal to said beam path, said target face having a plurality of surfaces arranged in series with the surfaces of each series facing substantially the same direction different than the direction faced by the surfaces of said other series, means between said electron gun and said target for scanning said electron beam over said target surfaces, a plate electrode positioned transversely to said beam path and between said gun and said target, said plate electrode having an aperture therethrough offset from said beam path, a first beam deflecting means between said gun and said plate electrode for displacing the electrons of said beam from said beam path to pass through said offset aperture, a second beam deflecting means between said plate electrode and said target for directing the electrons of said displaced beam at an angle back to said beam path, and focusing means between said second deflecting means and said target for focusing said beam onto said target.

5. An electron discharge device, comprising an electron gun means for forming a beam of electrons along a path, a target electrode having a face positioned substantially normal to said beam path, said target face having a plurality of surfaces arranged in series with the surfaces of each series facing substantially the same direction different from the direction faced by the surfaces of said other series, means between said electron gun and said target for scanning said electron beam over said target surface, deflecting means between said gun and said target electrode for causing said electron beam to approach said target electrode from said direction, said deflecting means comprising a plate electrode positioned transversely to said beam path and between said gun and said target, said plate electrode having an aperture therethrough offset from said beam path, a first beam deflecting means between said gun and said plate electrode for displacing the electrons of said beam from said beam path to pass through said offset aperture, a beam defining electrode between said electron gun means and said target, said beam defining electrode comprising a plate transverse to said beam path and having an aperture therethrough aligned with said normal beam path, a second beam deflecting means between said plate electrode and said defining electrode for directing the electrons of said displaced beam through said apertured defining electrode at an angle to said beam path, and focusing means between said defining electrode and said target for focusing the electrons passing through said defining electrode onto said target electrode.

6. An electron discharge device comprising, an electron gun means for forming a beam of electrons along a normal path, a target electrode positioned transversely of said beam path, said target electrode having a plurality of surfaces divided into series with the surfaces of each series facing substantially the same direction different from the direction faced by the surfaces of the other series, means between said gun and said target for scanning said electron beam over said target surfaces, means between said electron gun and said target electrode for forming an electron beam focusing field coaxial with said normal beam path, and beam deflecting means between said electron gun and said focusing means for directing said electron beam through said focusing field along a path spaced from said field axis, whereby said beam approaches said target at an angle to said normal beam path.

7. An electron discharge device comprising, an electron beam forming and supplying means for directing an electron beam along a normal path, a target spaced from said electron beam supplying means and mounted transversely of said normal beam path, said target including a plurality of elemental surfaces arranged in groups, and with the surfaces of each group facing in substantially the same direction relative to the normal to the target surface, said direction being different from the direction faced by the surfaces of another group, means between said electron supplying means and said target for causing rotational movement of said beam about said normal path, an apertured commutating electrode between said last named means and said target for cutting off said beam at predetermined points of rotation and means between said commutating electrode and said target for reversing the effect of said means for causing rotational movement of said beam and for directing said beam against said target from said different directions.

8. An electron discharge device comprising, an electron gun for forming a beam of electrons along a normal path, a target electrode spaced from and substantially transverse to said beam path, said target electrode including a plurality of elemental surfaces arranged in groups with the surfaces of each group facing substantially in the same direction relative to the normal to the target surface, said direction being different than the direction faced by the surfaces of another group, scanning means between said electron gun and said target for scanning said electron beam over said elemental target surfaces, electron beam focusing means between said electron gun and said target for forming an electron lens field coaxial with said normal beam path, and beam deflecting means between said electron gun and said focusing means for sequentially directing said electron beam through said focusing field along paths spaced from said field axis in said directions, whereby said beam approaches said target electrode substantially from said directions.

9. An electron discharge device comprising, an electron gun for forming a beam of electrons along a path, a target electrode positioned transversely of said beam path, scanning means between said gun and said target for scanning said beam over a face of said target, said target having a face with a center of curvature at substantially the point of deflection of said beam by said scanning means, said target face including a plurality of elemental areas arranged in groups with the areas of each group facing substantially in the same direction relative to the normal to the target surface, said direction being different than the direction faced by the areas of another group, a phosphor coating on each of said areas, electron beam focusing means between said electron gun and said target for forming an electron lens field coaxial with said normal beam path, and beam deflecting means between said electron gun and said focusing means for sequentially directing said electron beam through said focusing field along paths spaced from said field axis in said directions, whereby said beam approaches said target substantially from said directions.

10. An electron discharge device comprising an electron gun for forming a beam of electrons along a path, a target electrode positioned transversely of said beam path, scanning means between said gun and said target for scanning said beam over a face of said target, said target having a face with a center of curvature at substantially the point of deflection of said beam by said scanning means, said target face having a plurality of tubular members, positioned with their longitudinal axes normal to said target face, a plurality of phosphor coatings on the inner surface of each of said tubular members, each of said phosphor coatings adapted to luminesce with a different colored light and positioned to face substantially in the same direction relative to the normal to said target face as the corresponding phosphor coatings of the other of said tubular members, said direction being different than the direction faced by another phosphor coating in each of said tubular members, electron beam focusing means between said electron gun and said target for forming an electron lens field coaxial with said normal beam path, and beam deflecting means between said electron gun and said focusing means for sequentially directing said electron beam through said focusing field along paths spaced from said field axis in said directions, whereby said beam approaches said target substantially from said directions.

11. An electron discharge device comprising, an electron gun for forming a beam of electrons along a path, a target electrode positioned transversely of said beam path, scanning means between said gun and said target for scanning said beam over a face of said target, said target having a face with a center of curvature at substantially the point of deflection of said beam by said scanning means, said target surface having a plurality of tubular members of hexagonal cross-sections and having their axes normal to said target surface, a plurality of phosphor coatings each adapted to luminesce with a different colored light on the inner faces of said tubular members, each of said phosphor coatings positioned to face substantially in the same direction relative to the axis of said respective tubular member as the corresponding phosphor coatings of the other of said tubular members, said direction being different than the direction faced by a differently luminescing phosphor coating in said tubular members, and deflecting means including a focussing coil between said gun and said target for causing said beam to strike said target from one of said different directions.

12. An electron discharge device comprising, an electron gun for forming a beam of electrons along a path, a target electrode positioned transversely of said beam path, said target electrode including a plurality of elemental areas arranged in groups, a phosphor coating having a colored luminescence on said areas of each group, scanning means between said gun and said target for scanning said beam over said target face, and focusing means between said gun and said target for forming an electron beam coaxial with said normal beam path for focusing the electrons of said beam to a point on said target face, and beam rotating means between said electron gun and said focusing means for sequentially directing said electron beam through said focusing field along paths spaced from said field axis, whereby said beam approaches said target substantially from different directions.

13. An electron discharge device comprising, an electron gun for forming a beam of electrons along a path, a target electrode positioned transversely of said beam path, said target electrode including a plurality of elemental areas arranged in groups, a phosphor coating having a colored luminescence on said areas of each group, scanning means between said gun and said target for scanning said beam over said target face, and focusing means between said gun and said target for forming an electron beam coaxial with said normal beam path for focusing the electrons of said beam to a point on said target face, a first beam rotating means between said gun and said focusing means for directing said beam along paths divergent from its normal path, and a second beam rotating means between said first beam rotating means and said focusing means for directing said divergent beam into paths converging with said normal beam path, and spaced from said focusing field axis within said field, whereby said beam approaches said target substantially from different directions.

References Cited in the file of this patent

UNITED STATES PATENTS

| Number | Name | Date |
|---|---|---|
| 2,053,537 | Schlesinger | Sept. 8, 1936 |
| 2,434,446 | Toulon | Jan. 13, 1948 |
| 2,461,515 | Bronwell | Feb. 15, 1949 |
| 2,480,848 | Geer | Sept. 6, 1949 |
| 2,481,839 | Goldsmith | Sept. 13, 1949 |
| 2,518,200 | Sziklai et al. | Aug. 8, 1950 |
| 2,529,485 | Chew | Nov. 14, 1950 |
| 2,532,511 | Okolicsanyi | Dec. 5, 1950 |

FOREIGN PATENTS

| Number | Country | Date |
|---|---|---|
| 866,065 | France | May 31, 1941 |